United States Patent
Lee et al.

(10) Patent No.: US 10,708,942 B2
(45) Date of Patent: Jul. 7, 2020

(54) CONTROL RESOURCES REUSE FOR DATA TRANSMISSION IN WIRELESS COMMUNICATION

(71) Applicant: QUALCOMM Incorporated, San Diego, CA (US)

(72) Inventors: Heechoon Lee, San Diego, CA (US); Jing Sun, San Diego, CA (US); Wanshi Chen, San Diego, CA (US); Shimman Patel, San Diego, CA (US); Seyedkianoush Hosseini, San Diego, CA (US); Peter Pui Lok Ang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/703,821

(22) Filed: Sep. 13, 2017

(65) Prior Publication Data

US 2018/0227922 A1    Aug. 9, 2018

Related U.S. Application Data

(60) Provisional application No. 62/457,097, filed on Feb. 9, 2017, provisional application No. 62/458,502, filed on Feb. 13, 2017.

(51) Int. Cl.
*H04W 72/12*    (2009.01)
*H04W 72/04*    (2009.01)
*H04W 74/00*    (2009.01)
*H04W 28/22*    (2009.01)
(Continued)

(52) U.S. Cl.
CPC ........... *H04W 72/1289* (2013.01); *H04L 1/00* (2013.01); *H04L 1/0046* (2013.01); *H04L 1/0067* (2013.01); *H04L 5/0044* (2013.01); *H04L 5/0082* (2013.01); *H04L 5/0094* (2013.01); *H04W 16/14* (2013.01); *H04W 28/22* (2013.01);
(Continued)

(58) Field of Classification Search
CPC ............... H04W 48/12; H04W 72/042; H04W 72/1273; H04W 72/1289; H04W 74/006; H04W 28/22
See application file for complete search history.

(56) References Cited

U.S. PATENT DOCUMENTS

2013/0114419 A1    5/2013  Chen et al.
2015/0173048 A1*   6/2015  Seo ................... H04W 72/1247
                                                           370/329
(Continued)

OTHER PUBLICATIONS

International Search Report and Written Opinion—PCT/US2018/014521—ISA/EPO—dated Jun. 27, 2018.

(Continued)

*Primary Examiner* — Ashley Shivers
(74) *Attorney, Agent, or Firm* — Loza & Loza, LLP

(57) ABSTRACT

Aspects of the present disclosure provide various methods and apparatuses configured to reuse, reallocate, reserve, or reassign available control resources in a control region for carrying downlink (DL) payload or user data. The inventive concept and idea may also be applied to reuse control resources for uplink (UL) and/or sidelink user data transmission in both frequency division duplex (FDD) and time division duplex (TDD) configurations in other embodiments.

12 Claims, 18 Drawing Sheets

(51) Int. Cl.
| | |
|---|---|
| *H04L 1/00* | (2006.01) |
| *H04W 16/14* | (2009.01) |
| *H04L 5/00* | (2006.01) |
| *H04W 48/08* | (2009.01) |
| *H04L 27/26* | (2006.01) |

(52) U.S. Cl.
CPC ..... *H04W 72/042* (2013.01); *H04W 72/0406* (2013.01); *H04W 72/0466* (2013.01); *H04W 72/1273* (2013.01); *H04W 74/006* (2013.01); *H04L 5/001* (2013.01); *H04L 5/0007* (2013.01); *H04L 5/0048* (2013.01); *H04L 5/0053* (2013.01); *H04L 5/0064* (2013.01); *H04L 27/261* (2013.01); *H04W 48/08* (2013.01); *H04W 72/0446* (2013.01)

(56) References Cited

U.S. PATENT DOCUMENTS

| | | | | |
|---|---|---|---|---|
| 2015/0257139 | A1* | 9/2015 | Chen | H04B 7/024 370/329 |
| 2016/0087774 | A1* | 3/2016 | Guo | H04L 5/0051 370/329 |
| 2017/0142712 | A1* | 5/2017 | Lee | H04W 72/0446 |
| 2017/0230994 | A1* | 8/2017 | You | H04W 72/042 |
| 2019/0173623 | A1* | 6/2019 | Khosravirad | H04L 1/0079 |
| 2019/0379487 | A1* | 12/2019 | Hwang | H04L 1/00 |

OTHER PUBLICATIONS

Intel Corporation: "Consideration on S-PDCCH design for latency reduction", 3GPP Draft; R1-164161, 3rd Generation Partnership Project (3GPP), Mobile Competence Centre ; 650, Route Des Lucioles; F-06921, Sophia-Antipolis Cedex, France, vol. RAN WG1, No. Nanjing, China; May 23, 2016-May 27, 2016 May 14, 2016 (May 14, 2016), pp. 1-5, XP051096557, Retrieved from the Internet: URL: http://www.3gpp.org/ftp/tsg_ran/WG1_RL1/TSGR1_85/Docs/.

Partial International Search Report—PCT/US2018/014521—ISA/EPO—dated Apr. 24, 2018.

Sharp: "Group Common PDCCH for NR", 3GPP Draft; R1-1703237, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 7, 2017 (Feb. 7, 2017), pp. 1-3, XP051221898, Retrieved from the Internet: URL: http://www.3gpp.org/ftp/tsg_ran/WG1_RL1/TSGR1_88/Docs/.

Texas Instruments: "On Multi-Subframe and Cross-Subframes Scheduling for Small Cell Enhancements", 3GPP Draft; R1-131946, 3rd Generation Partnership Project (3GPP), Mobile Competence Centre; 650, Route Des Lucioles; F-86921 Sophia-Antipolis Cedex; France, vol. RAN WG1, No. Fukuoka, Japan; May 20, 2013-May 24, 2013, May 11, 2013 (May 11, 2013), 2 pages, XP050697732, Retrieved from the Internet: URL: http://www.3gpp.org/ftp/tsg_ran/WG1_RL1/TSGR1_73/Docs/.

ZTE, et al., "NR DL Control Channel Structure", 3GPP Draft; R1-1611292 , 3rd Generation Partnership Project (3GPP), Mobile Competence Centre; 650, Route Des Lucioles; F-06921, Sophia-Antipolis Cedex; France, vol. RAN WG1, No. Reno, USA; Nov. 14, 2016-Nov. 18, 2016, Nov. 13, 2016 (Nov. 13, 2016), pp. 1-8, XP051175273, Retrieved from the Internet: URL: http://www.3gpp.org/ftp/Meetings_3GPP_SYNC/RAN1/Docs/.

\* cited by examiner

CONTROL RESOURCES REUSE FOR DATA TRANSMISSION IN WIRELESS COMMUNICATION

PRIORITY CLAIM

This application claims priority to and the benefit of provisional patent application No. 62/457,097, filed on 9 Feb. 2017, and provisional patent application No. 62/458,502, filed on 13 Feb. 2017 in the United States Patent and Trademark Office, the entire contents of which are incorporated herein by reference as if fully set forth below in their entirety and for all applicable purposes.

TECHNICAL FIELD

The technology discussed below relates generally to wireless communication systems, and more particularly, to control resource reuse for transmitting payload data in wireless communication.

INTRODUCTION

Next generation mobile networks may provide increased performance in wireless broadband communication with a lower cost-per-bit as compared to the current 3G and/or 4G technologies. An example of a next generation mobile network is 5G New Radio (NR), which can enable a higher level of performance in terms of latency, reliability, and security, and can be scaled to efficiently connect a large number of wireless devices such as Internet of Things (IoT) devices and remote sensors. While 5G NR may provide significantly wider bandwidth and larger capacity than legacy networks, not all network devices need and/or are capable of supporting or utilizing the full bandwidth or communication resources available in future 5G NR networks.

As the demand for mobile broadband access continues to increase, research and development continue to advance and improve bandwidth and communication resources utilization in wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various methods and apparatuses configured to reuse, reallocate, reserve, or reassign available control resources in a control region for carrying downlink (DL) payload or user data. The inventive concept and idea may also be applied to reuse control resources for uplink (UL) and/or sidelink user data transmission in both frequency division duplex (FDD) and time division duplex (TDD) configurations in other embodiments.

An aspect of the present disclosure provides a method of wireless communication. An apparatus communicates with a user equipment (UE) utilizing a slot including a control portion and a data portion. The apparatus further determines that one or more communication resources allocated to the control portion are unused for transmitting control data, and reallocates and utilize the one or more reallocated communication resources for transmitting user data in the data portion.

Another aspect of the present disclosure provides an apparatus that includes a communication interface configured to communicate with a user equipment (UE), a memory, and a processor operatively coupled with the communication interface and memory. The processor and memory are configured to communicate with the UE utilizing a slot including a control portion and a data portion. The processor and memory are further configured to determine that one or more communication resources allocated to the control portion are unused for transmitting control data. The processor and memory are further configured to reallocate and utilize the one or more reallocated communication resources for transmitting user data in the data portion.

Another aspect of the present disclosure provides a method of wireless communication. An apparatus receives, from a scheduling entity, an indication that one or more communication resources of a control portion of a slot are reallocated to a data portion of the slot. The apparatus further receives, from the scheduling entity, user data in the data portion including the one or more reallocated communication resources.

Another aspect of the present disclosure provides an apparatus including a communication interface configured to communicate with a scheduling entity, a memory, and a processor operatively coupled with the communication interface and memory. The processor and memory are configured to receive, from the scheduling entity, an indication that one or more communication resources of a control portion of a slot are reallocated to a data portion of the slot. The processor and memory are further configured to receive, from the scheduling entity, user data in the data portion including the one or more reallocated communication resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Next generation mobile networks can provide significantly greater bandwidth than legacy 3G/4G networks to support wireless communication for a large number of wireless devices. One exemplary next generation network is 5G New Radio (NR). However, some wireless devices may not need or be capable of utilizing the full bandwidth or available communication resources due to, for example, hardware or resource limitations. In some examples, a communication device may not be able to utilize or need all of the available communication resources (e.g., time and/or frequency resources in a control region) for transmitting and/or receiving control information. In that case, unused control resources may be reused or reallocated to carry user payload or data.

Aspects of the present disclosure provide various methods and apparatuses configured to reuse, reallocate, reserve, or reassign available control resources in a control region for carrying downlink (DL) payload or user data. However, the present disclosure is not limited to the DL examples described below. The inventive concept and idea may be applied to reuse control resources for uplink (UL) and/or sidelink user data transmission in both frequency division duplex (FDD) and time division duplex (TDD) configurations in other embodiments.

Figure 1:
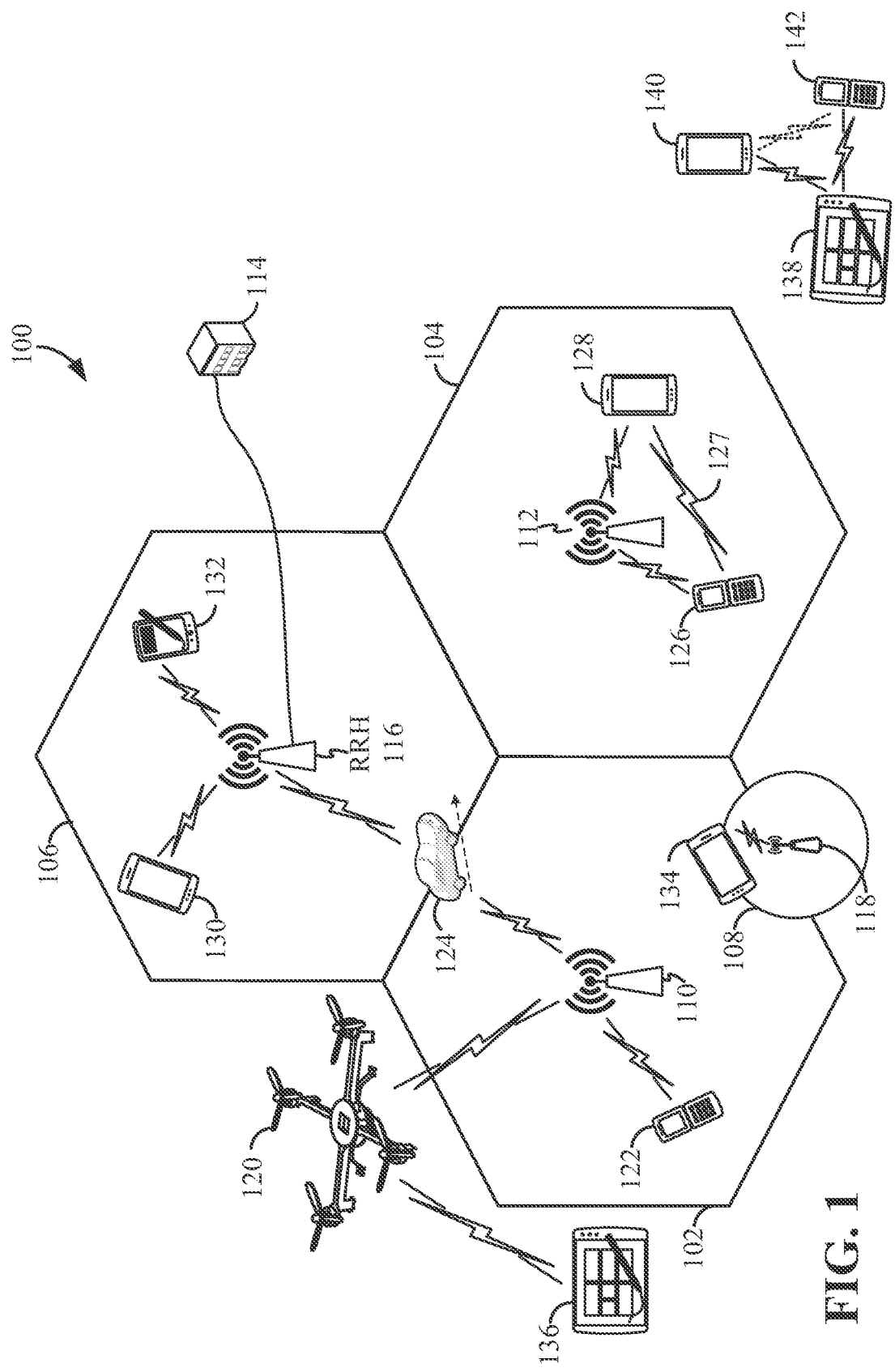
FIG. 1 is a conceptual diagram illustrating an example of a radio access network according to some aspects of the disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNB, or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station or scheduling entity. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
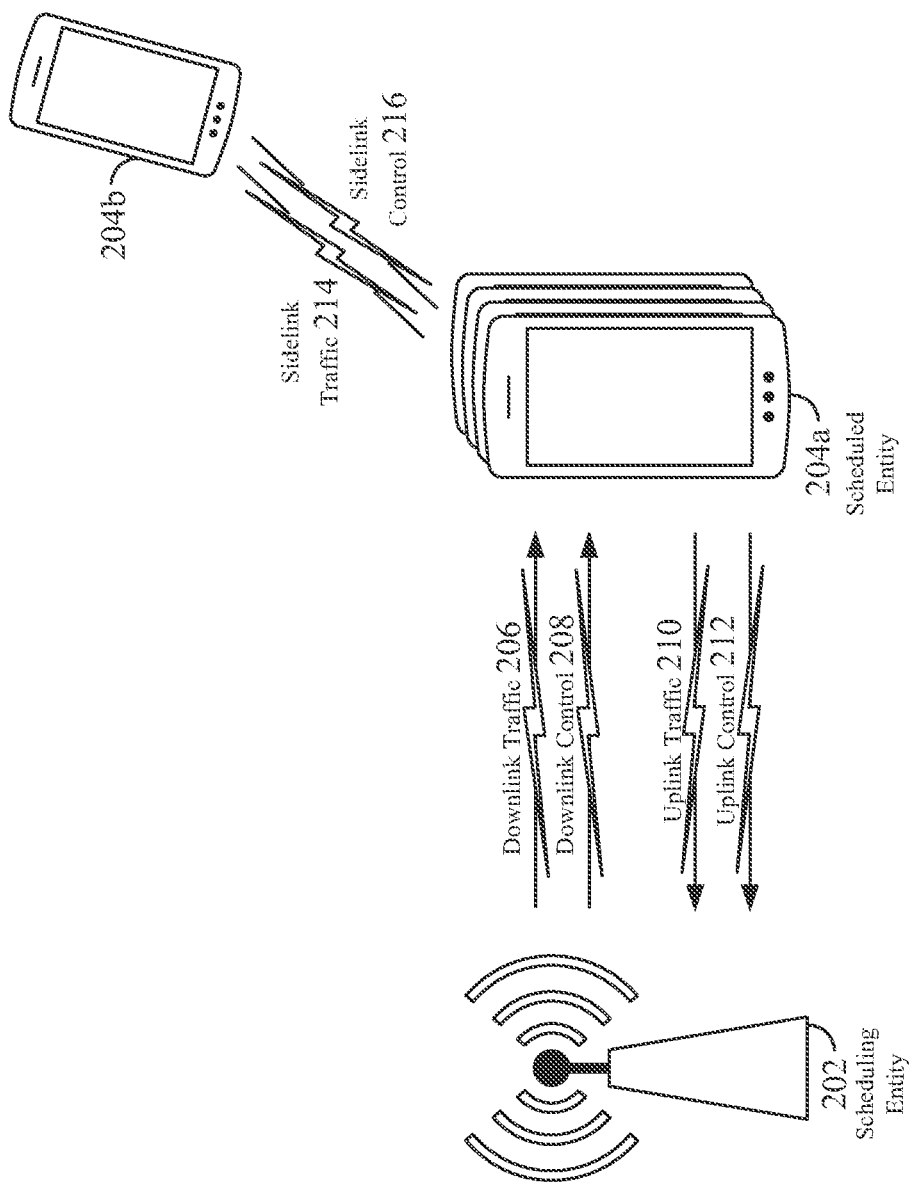
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled time-frequency resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling resources or traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
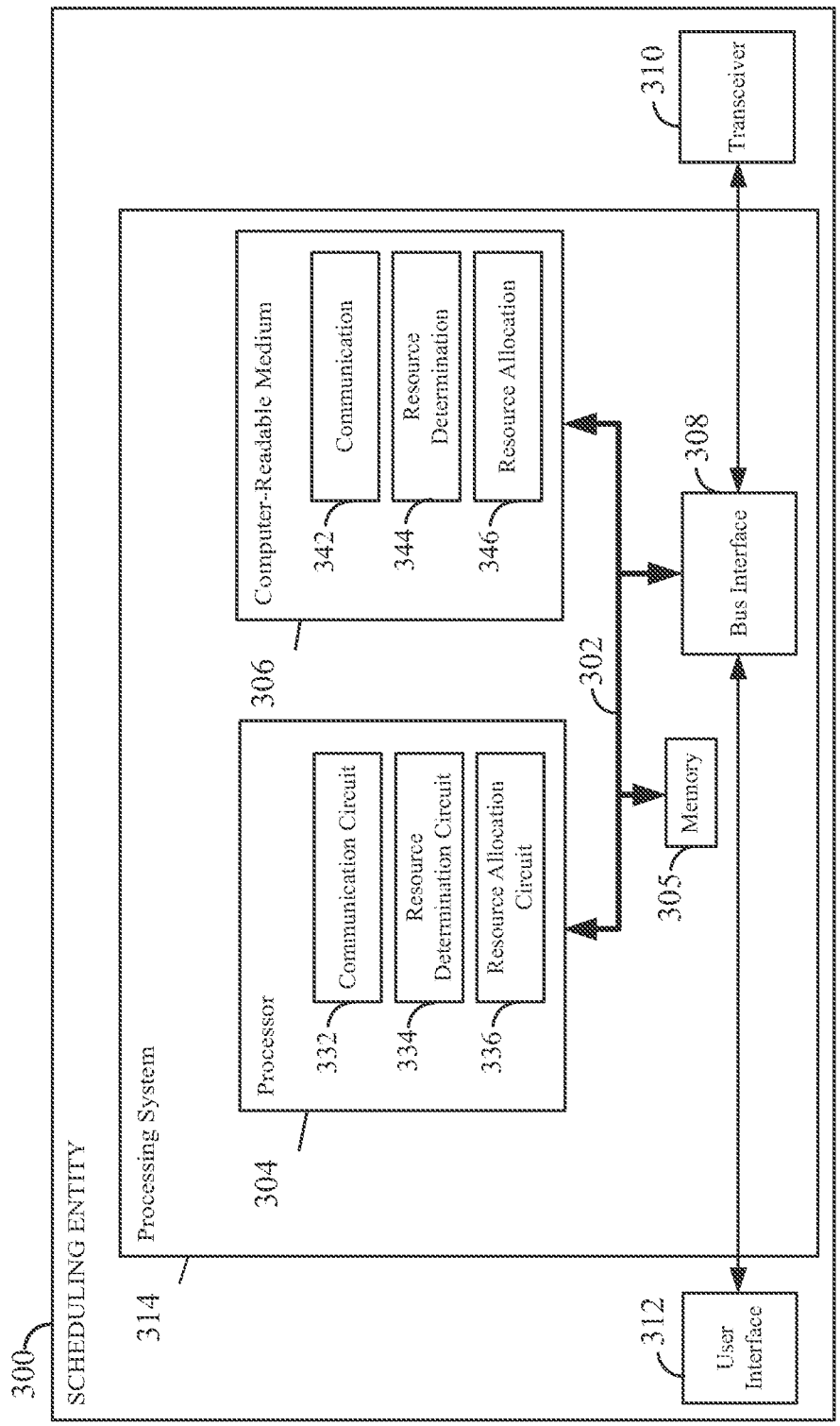
FIG. 3 is a block diagram illustrating an example of a hardware implementation for a scheduling entity employing a processing system according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1 and/or 2. In another example, the scheduling entity 300 may be a base station as illustrated in any one or more of FIGS. 1 and/or 2.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions and processes described herein. That is, the processor 304, as utilized in a scheduling entity 300, may be used to implement any one or more of the processes and procedures described below and illustrated in FIGS. 5-18.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include circuitry configured to implement one or more of the functions described below in relation to FIGS. 5-18. In some examples, the processor 304 may include a communication circuit 332, a resource determination circuit 334, and a resource allocation circuit 336. The communication circuit 332 in connection with communication instructions 342 may be configured to perform various communication functions, for example, receiving, transmitting, encoding, decoding, multiplexing, interleaving, rate matching, etc. The resource determination circuit 334 in connection with resource determination instructions 344 may be configured to determine whether any resource elements (REs) or time-frequency control resources are not used or needed for transmitting control data in a control portion of a slot or subframe. The resource allocation circuit 336 in connection with resource allocation instructions 346 may be configured to allocate time-frequency resources in a slot or subframe. For example, the resource allocation circuit 336 may reallocate control resources to a data portion for carrying user data or payload.

The processor 304 is responsible for managing the bus 302 and general processing, including the execution of software stored on the computer-readable medium 306. In one or more examples, the computer-readable storage medium 306 may include software configured to implement one or more of the functions and processes described in relation to FIGS. 5-18. For example, the software may include communication instructions 342, resource determination instructions 344, and resource allocation instructions 346. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
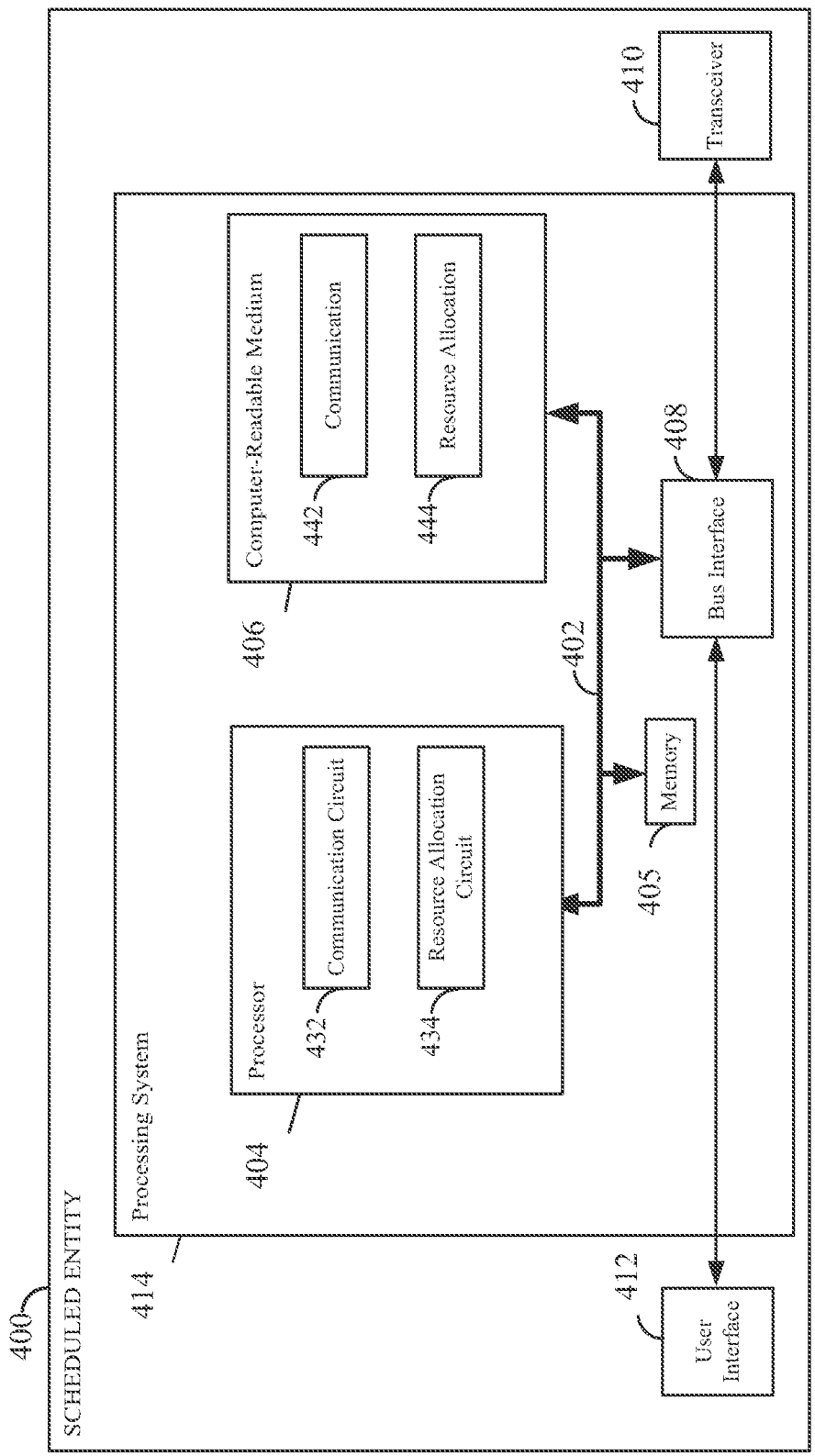
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1 and/or 2.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a communication interface (e.g., transceiver 410) substantially similar to those described above in FIG. 3. That is, the processor 404, as utilized in a scheduled entity 400, may be used to implement any one or more of the functions and processes described herein.

In some aspects of the disclosure, the processor 404 may include circuitry configured to implement one or more of the functions and processes described below in relation to FIGS. 5-18. For example, the processor 404 may include a communication circuit 432 and a resource allocation circuit 434. The communication circuit 432 in connection with communication instructions may be configured to perform various communication functions, for example, receiving, transmitting, encoding, decoding, multiplexing, interleaving, rate matching, etc. The resource allocation circuit 434 in connection with resource allocation instructions 444 may be configured to determine the communication resources in an expanded data portion that includes resources reallocated from a control portion of a slot. For example, the control resources may be reused for carrying user payload or data in a physical downlink shared channel (PDSCH).

Figure 5:
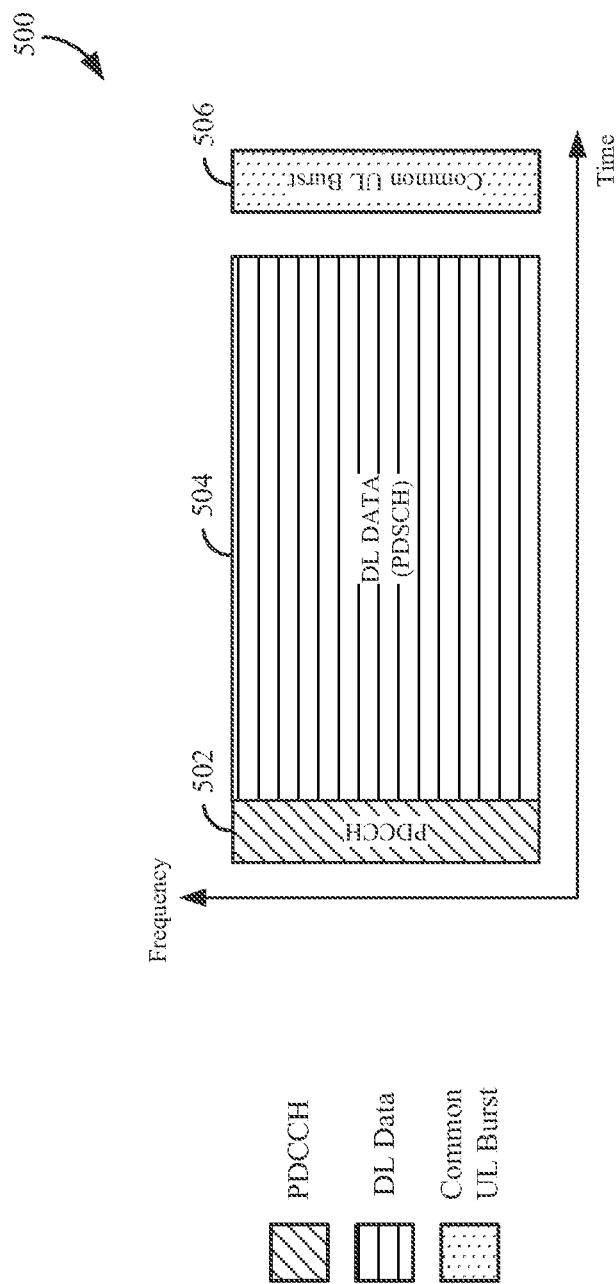
FIG. 5 is a diagram illustrating an example of a downlink centric slot according to some aspects of the disclosure.
Figure 6:
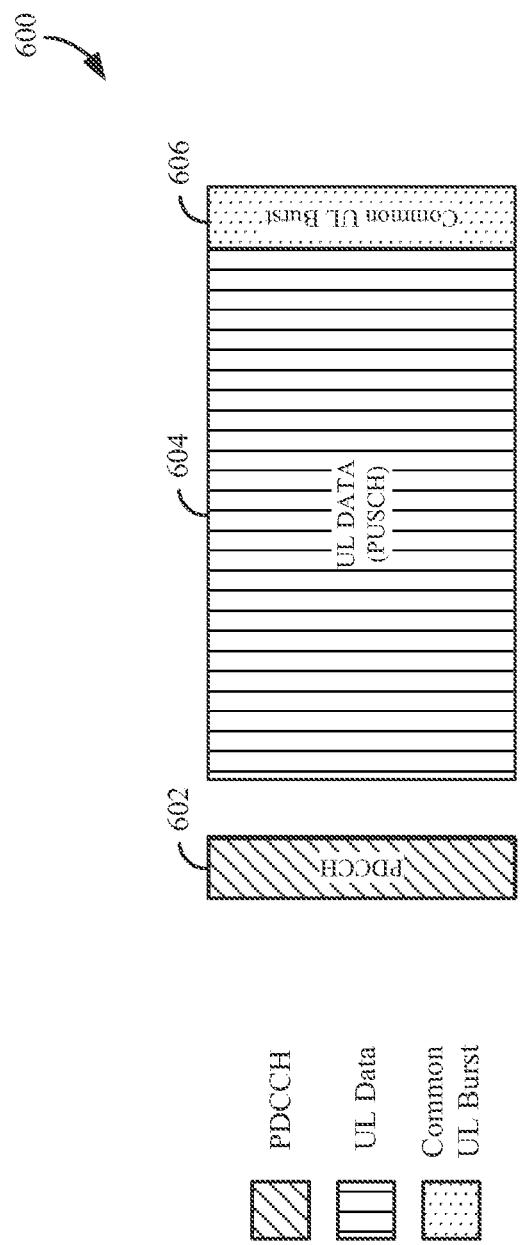
FIG. 6 is a diagram illustrating an example of an uplink centric slot according to some aspects of the disclosure.

FIGS. 5-6 are schematic diagrams that illustrate the structure of various slot formats according to a variety of aspects of this disclosure. As illustrated in FIGS. 5 and 6, in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments.

FIG. 5 is a diagram showing an example of a DL-centric slot 500. The DL-centric slot may include a control portion 502. The control portion 502 may exist in the initial, starting, or beginning portion of the DL-centric slot. The control portion 502 may include various scheduling information and/or control resources corresponding to various portions of the DL-centric slot. In some configurations, the control portion 502 may include a physical DL control channel (PDCCH), as indicated in FIG. 5. The DL-centric slot may also include a DL data portion 504. The DL data portion 504 may sometimes be referred to as the payload or user data of the DL-centric slot. The DL data portion 504 may include the communication resources (e.g., time-frequency resources) utilized to communicate DL data from a scheduling entity 202 (e.g., base station, eNB, gNB) to a scheduled entity 204 (e.g., UE). In some configurations, the DL data portion 504 may include a physical DL shared channel (PDSCH) or the like.

The DL-centric slot may also include a common UL portion (illustrated as common UL burst 506 in FIG. 5). The common UL portion 506 may sometimes be referred to as an UL burst, a common UL burst, and/or various other suitable terms. The common UL portion 506 may include feedback information corresponding to various other portions of the DL-centric slot 500. For example, the common UL portion 506 may include feedback information corresponding to the control portion 502. Non-limiting examples of feedback information may include an ACK signal, a NACK signal, a HARQ indicator, channel quality, and/or various other suitable types of feedback information. In some examples, the common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

FIG. 6 is a diagram showing an example of an UL-centric slot 600. The UL-centric slot may include a DL control portion 602. The control portion 602 may exist in the initial, starting, or beginning portion of the UL-centric slot. The control portion 602 in FIG. 6 may be similar to the control portion 502 described above with reference to FIG. 5. The UL-centric slot 600 may also include an UL data portion 604. The UL data portion 604 may sometimes be referred to as the payload or user data of the UL-centric slot. The UL data portion 604 may refer to the communication resources utilized to communicate UL data from the scheduled entity 204 (e.g., UE) to the scheduling entity 202 (e.g., base station, eNB, gNB). In some configurations, the UL data portion 604 may include a physical UL shared channel (PUSCH) or the like. As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). The UL-centric slot may also include a common UL portion 606. The common UL portion 606 in FIG. 6 may be similar to the common UL portion 506 described above with reference to FIG. 5. The common UL portion 606 may include additional or alternative information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

Figure 7:
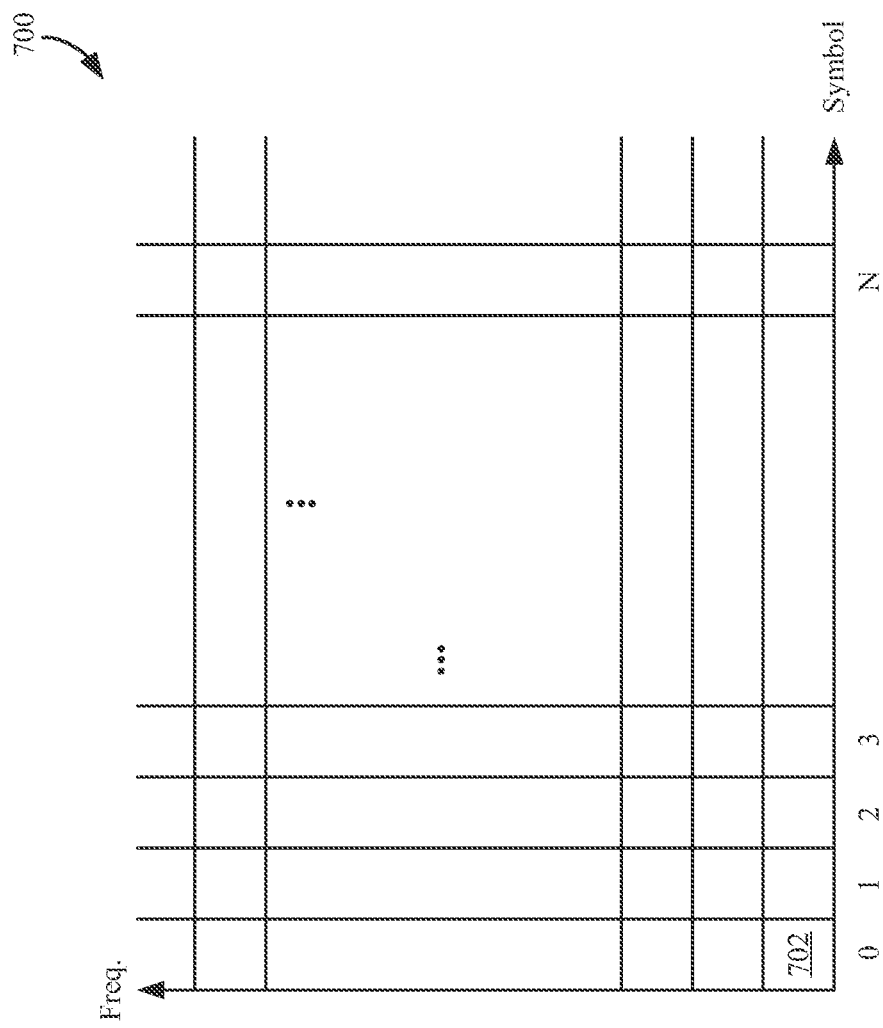
FIG. 7 is a diagram illustrating an example of a communication resource grid according to some aspects of the disclosure.

FIG. 7 is a diagram illustrating a communication resource grid 700 for wireless communication in accordance with an aspect of the disclosure. Wireless communication can utilize resources in a frequency domain and/or a time domain. In FIG. 7, the vertical direction represents frequency, with units of subcarriers or tones, and the horizontal direction represents time, with units of symbols (e.g., OFDM symbols). Each resource element (e.g., resource element 702) represents a combination of a time domain resource (e.g., symbol time) and a frequency domain resource (e.g., bandwidth, carrier, tone) that may be allocated, assigned, reserved, or scheduled to transmit control information or user data. Some of the resource elements may be grouped together to be allocated as a unit or block, for example, a resource element group (REG).

Figure 8:
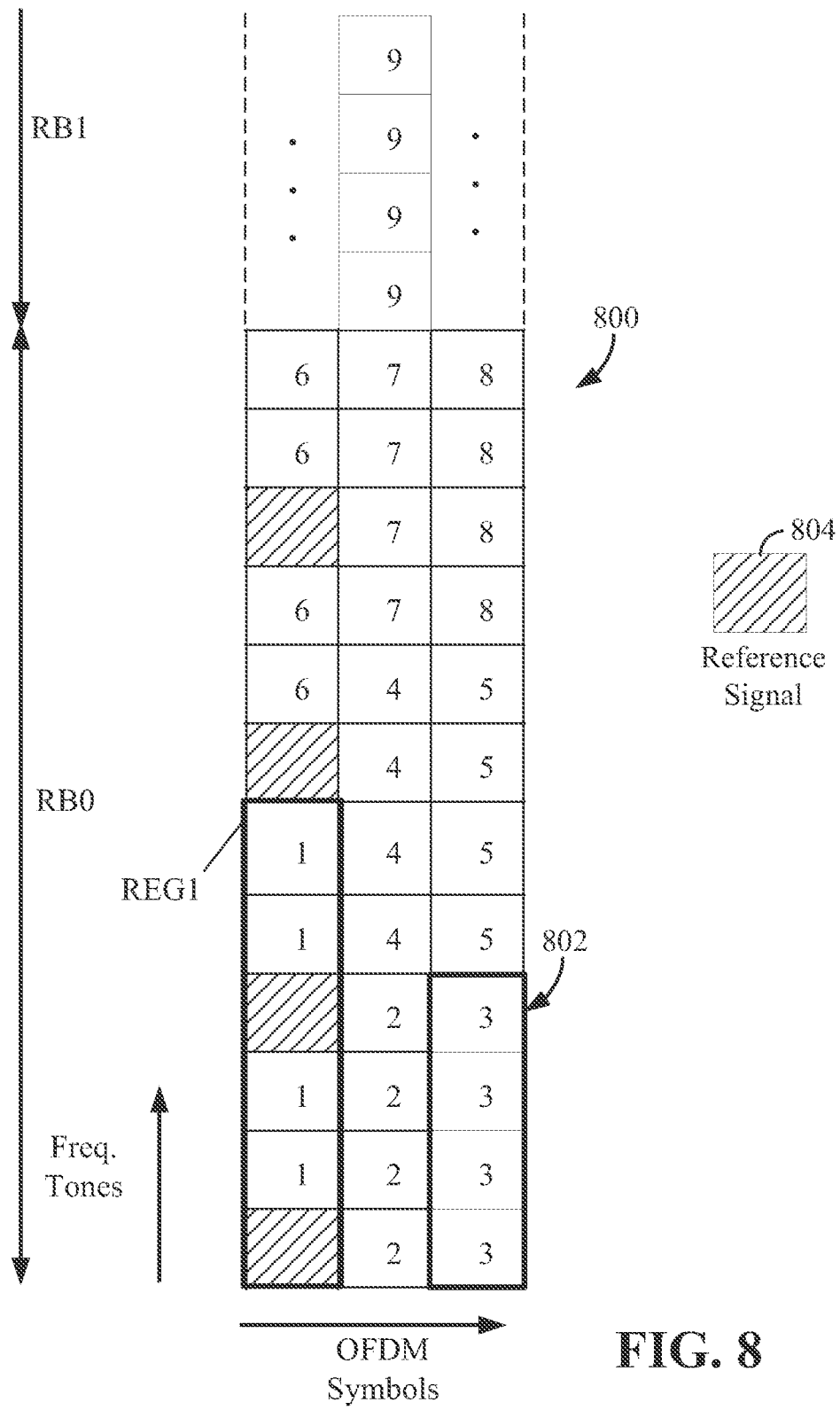
FIG. 8 is a diagram illustrating a portion of the communication resource grid of FIG. 7 according to some aspects of the disclosure.

FIG. 8 illustrates a portion of a resource grid showing a number of resource elements 800. The resource elements 800 may be the same as the resource element 702 of FIG. 7, for example, each corresponding to a certain OFDM symbol and frequency tone/carrier in a control region. In FIG. 8, frequency or bandwidth (BW) extends in the vertical direction, and time extends in the horizontal direction. The frequency or BW dimension is divided into units that may be referred to as frequency tones, OFDM tones, or sub-carriers; and the time dimension is divided into units that may be symbol durations or OFDM symbols. These intersecting divisions form a grid of resource elements (REs) similar to the resource elements shown in FIG. 7. In this example, each RE may correspond to a unit of one OFDM tone and one OFDM symbol.

The resource elements corresponding to the same OFDM symbol may be grouped into resource element groups (e.g., resource element group 802). In this example, each resource element group (REG) may include four resource elements. Nine REGs each including four REs are shown in FIG. 8 (e.g., REG1 through REG9). For example, REG1 includes the REs denoted by numeral 1. In other aspects of the disclosure, an REG may have more or less resource elements in other examples. The resource elements may also be grouped into REGs different from those shown in FIG. 8. FIG. 8 shows four exemplary reference signals 804 distributed in the first OFDM symbol. In other examples, more or fewer reference signals may be used in one or more symbols, and the reference signals may be located in REs different from those shown in FIG. 8. An REG may include one or more reference signals. In some examples, each REG may include reference signals.

In some examples, the control resource region of a DL slot spans the first several symbols of the slot. For example, the control resource region may span the first 2 or 3 symbols. The resource blocks (RBs) in the control region may be referred to as a control resource set (CORESET). A number of REGs 802 may be grouped or mapped to a number of control channel elements (CCEs) that may be represented logically by their index numbers (see FIG. 9). In some examples, nine REGs may be mapped to one CCE. A PDCCH may include any number of CCEs based on different aggregation levels, and the PDCCH may carry the downlink control information (DCI) and/or other control messages. One or more CCEs may be assigned to the search space (SS) of one or more UEs or scheduled entities, and the UE can find its PDCCH in the assigned CCE(s) or SS.

The number of CCEs available for carrying the PDCCH may be variable depending on the number of OFDM symbols used in the control region, the bandwidth of the system, and/or a number of antenna ports present at the scheduling entity. In some examples, consecutive CCEs may be mapped into REGs that are distributed (i.e., non-consecutive) in frequency. Consecutive CCEs may refer to CCEs that are consecutive in their numbering or ordering in the logical space. Two REGs are not consecutive or contiguous when they are not adjacent to each other (i.e., separated by one or more REs in frequency and/or time domain). This is called distributed CCE-to-REG mapping. In some examples, consecutive CCEs are mapped to REGs that are consecutive or contiguous in frequency. This is called localized CCE-to-REG mapping. For example, consecutive or adjacent REGs are not separated from each other by one or more REs.

An aggregation level (AL) of a PDCCH transmission refers to the number of CCEs utilized for the transmission. In some examples, the PDCCH may be transmitted using AL1, AL2, AL4, and/or AL8. For AL1, one CCE may be used to carry the PDCCH. For AL2, two CCEs may be used to carry the PDCCH. For AL4, four CCEs may be used to carry the PDCCH. For AL8, eight CCEs may be used to carry the PDCCH. Therefore, a higher AL can accommodate a bigger payload or more data bits in the PDCCH transmission than a lower AL.

A search space (SS) refers to the control resources (e.g., REG or CCE) in a slot assigned or allocated to a UE for finding its PDCCH. The control resources may be located in the beginning symbols (e.g., 1, 2, or 3 OFDMs) of a slot. The search space includes a set of CCEs from which the UE can find its PDCCH. Different UEs may use different search spaces. There are two types of search space: the common search space (CSS) and the UE-specific search space (USS). The common search space may carry the common downlink control information (DCI) that is broadcasted to all UEs or a group of UEs, and the UE-specific search space may carry the DCI for a specific UE. Each UE may monitor a predetermined search space (CCS and/or USS) for its DL control information in a PDCCH region (e.g., control portion 502 in FIG. 5) of a DL slot.

Figure 9:
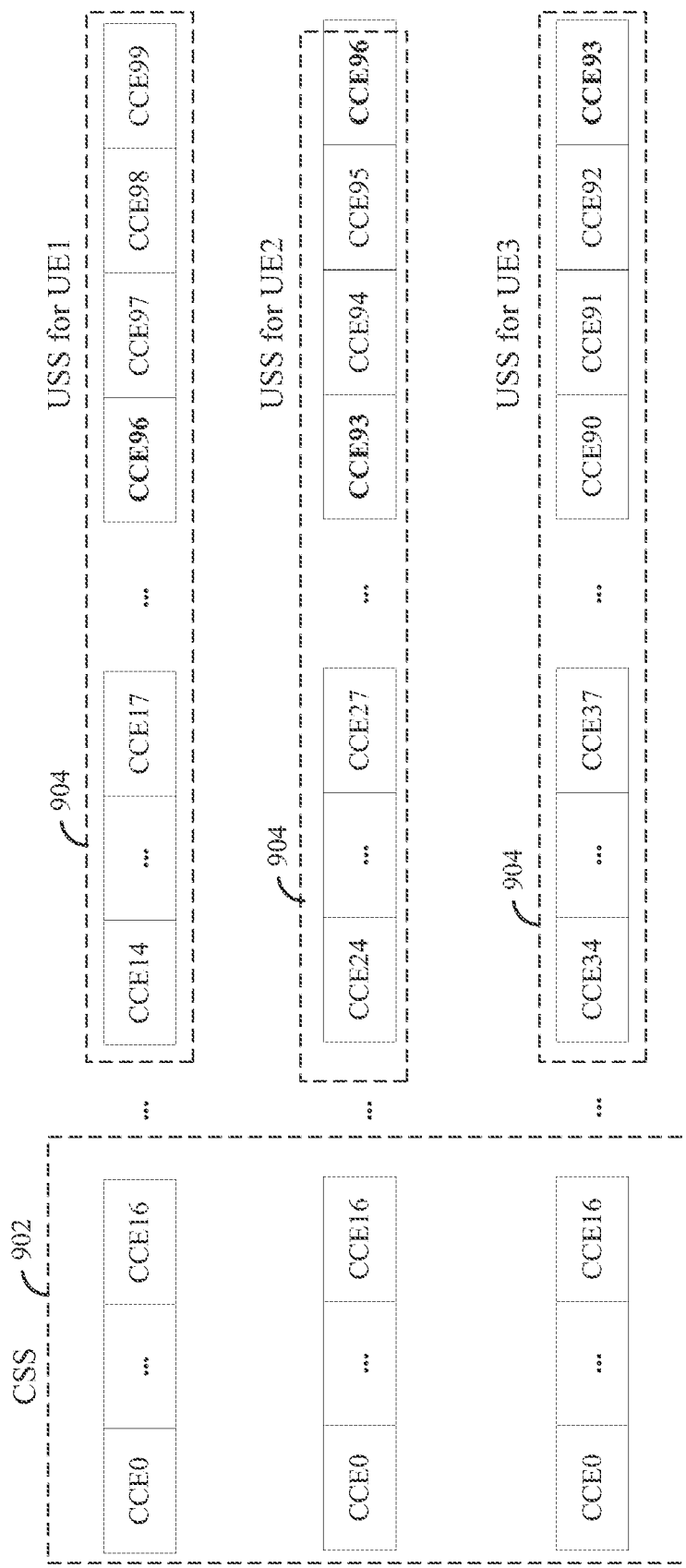
FIG. 9 is a diagram illustrating some exemplary search spaces according to some aspects of the disclosure.

Referring to FIG. 9, different scheduled entities or UEs (e.g., UE1, UE2, UE3) may have a same CSS 902 and different USS 904. For example, the CSS 902 may include the first sixteen CCEs (e.g., CCE0 to CCE16) that are assigned to all UEs. The USS of each UE may include different CCEs from the available CCEs, and the respective USSs 904 of the UEs may overlap. That is, some CCEs may be included in multiple USS 904. For example, CCE96 is included in the USS of UE1 and UE2, and CCE93 is included in the USS of UE2 and UE3. The CSS and USSs of FIG. 9 are only illustrative examples, and other search space designs may be used in other aspects of the present disclosure.

Because next generation networks (e.g., 5G NR) may support a bandwidth significantly wider than legacy 3G/4G networks, the control resources (e.g., REs, CCEs) of a slot may be partitioned or grouped into different control resource sets that span across the bandwidth. Each control resource set (CORESET) includes one more search spaces as described above. The CORESETs may be determined based on sub-bands or carriers such that a UE with a limited bandwidth can be assigned to the proper CORESET in a bandwidth that can be supported by the UE. That is a CORESET may not span the entire system bandwidth.

Figure 10:
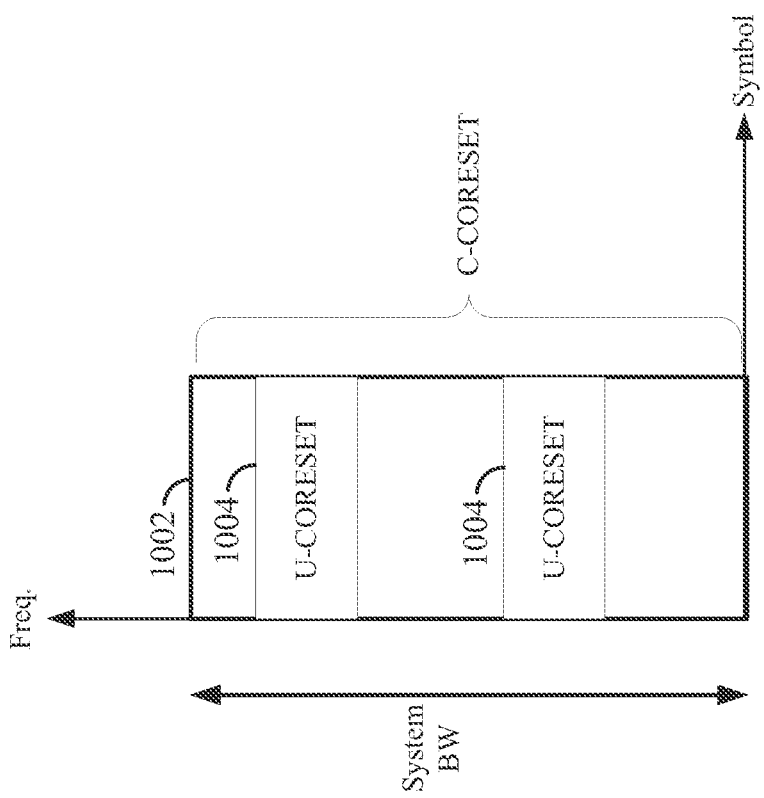
FIG. 10 is a diagram illustrating a control resource set (CORESET) design according to some aspects of the disclosure.

FIG. 10 is a diagram illustrating a CORESET design according to some aspects of the present disclosure. In some examples, the control resources of a CORESET may be located in a sub-band region or a subset of subcarriers of the entire bandwidth supported by the scheduling entity. The control resources may be in a common CORESET (C-CORESET) 1002 and a UE-specific CORESET (U-CORESET) 1004. The scheduling entity may configure the C-CORESET 1002 for all UEs, and optionally, one or more U-CORESETs 1004 for different UEs. The C-CORESET may include the CSS and USS of one or more UEs, and the U-CORESET may include the USS of the associated UE. The CORESETs may be configured and reconfigured by using a radio resource control (RRC) configuration procedure or other semi-static procedures. A semi-static configuration (e.g., RRC configuration) may be setup once and maintained for a predetermined duration that can span multiple slots. A C-CORESET may be reconfigured to another frequency or band, for example, when UEs with different capabilities join and/or leave the network.

In some aspects of the disclosure, some control resources of the control region of a DL slot (e.g., control portion 502 in FIG. 5) may be reused or reallocated for carrying DL payload or user data in the data portion of the slot. This situation may occur when the control region has extra time-frequency resources that are not used to transmit DL control information (e.g., DCI in PDCCHs) to the UEs. For example, more time-frequency resources may be available for reuse when fewer UEs are located in a certain cell or region. In that case, for example, there will be less PDCCH traffic. In some aspects of the disclosure, the time-frequency resources of the control region may be reused or reallocated to carry DL payload or user data in two different methods that will be described in more detail below.

Figure 11:
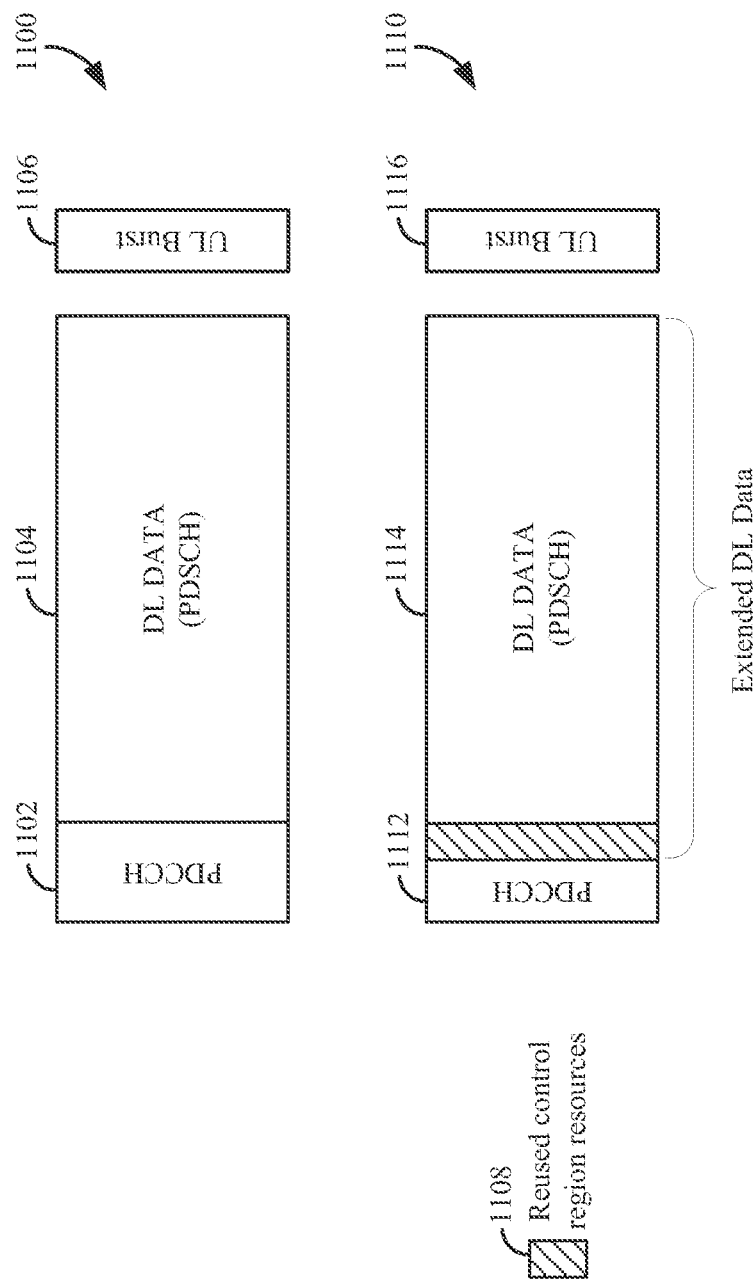
FIG. 11 is a diagram illustrating a time-domain only method for reusing control resources to carry user data according to some aspects of the disclosure.

FIG. 11 is a diagram illustrating a time-domain only method for reusing control resources to carry user data according to some aspects of the disclosure. An exemplary DL slot 1100 may include a DL control region 1102, a DL data portion 1104, and a common UL burst portion 1106. If a scheduling entity (e.g., base station or gNB) determines that not all time-frequency resources of the DL control region 1102 are needed for carrying DL control information (e.g., PDCCH), the scheduling entity may reuse the extra resources for the DL data portion 1104. For example, it may be assumed that there are X RBs in the control region 1102. If the base station or scheduling entity allocates, schedules, or assigns less than X RBs to transmit DL control data for all the UEs or user in the cell, there are extra resources that may be reused for carrying DL user data.

In some examples, the scheduling entity can expand the DL data portion in the time domain only with respect to the originally DL data region. In an exemplary slot 1110, the DL control region 1112 is reduced while the DL data region 1114 is expanded in the time-domain only to reuse the resources of the control region. In one aspect of the disclosure, the scheduling entity can transmit an RRC message or DCI to inform the UE the starting symbol position of the extended DL data region (e.g., PDSCH) in the time domain. For example, if the PDSCH originally is scheduled to start at symbol 3 of a slot, the expanded PDSCH can start at symbol 1 or 2 that is originally scheduled for the DL control portion.

Figure 12:
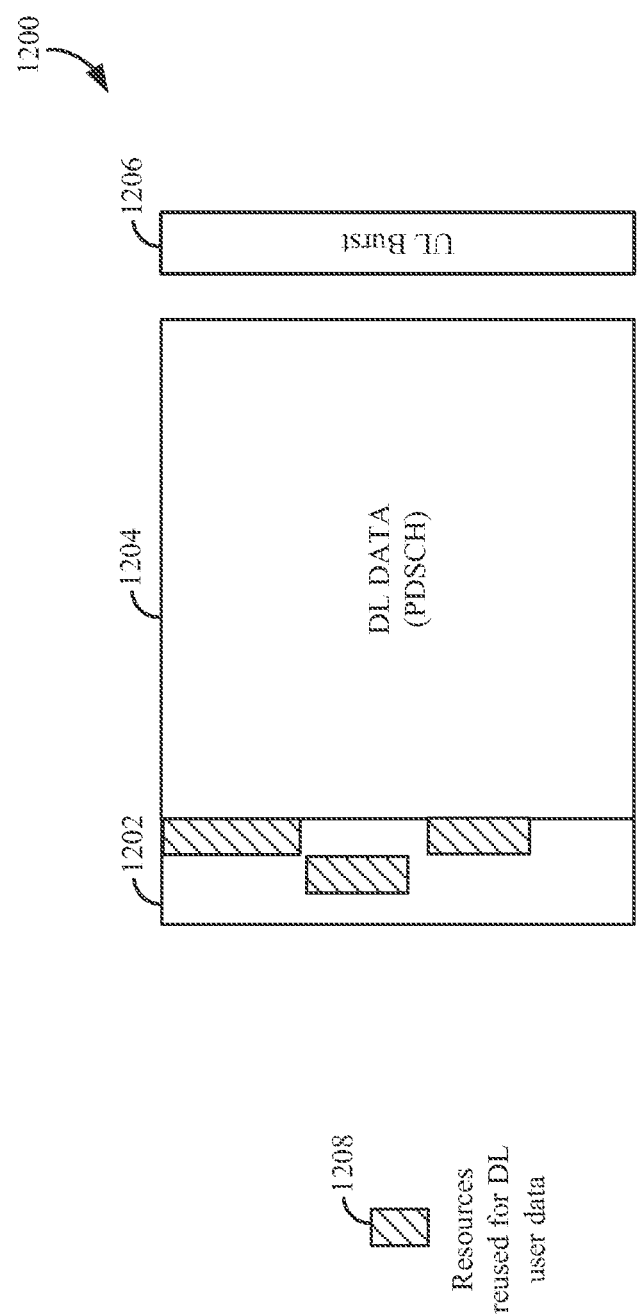
FIG. 12 is a diagram illustrating a time and frequency domain method for reusing control resources to carry user data according to some aspects of the disclosure.

FIG. 12 is a diagram illustrating a time and frequency domain method for reusing control resources to carry user data according to some aspects of the disclosure. Referring to FIG. 12, the scheduling entity may inform the UE the time and frequency information of some control resources 1208 that can be reused for the DL data portion 1204. The scheduling entity can transmit an RRC message and/or DCI to inform the UE the time and frequency locations of the resources that can be reused or reallocated. This method allows the reused resources to be identified independent of the PDSCH location in the data region. For example, in the time domain, the scheduling entity may indicate the starting symbol position only, or both starting and ending symbol positions. In the frequency domain, the scheduling entity may indicate the starting and ending frequencies or reused CCE(s) corresponding to the reusable control resources.

When control resources are reused or reallocated for carrying DL data, the scheduling entity may rate-match the data portion (e.g., PDSCH) based on various rules to utilize the additional resources. The function of rate matching is to match the number of bits in a transport block (TB) or unit to the number of bits that can be transmitted in the given allocation or resources. For example, rate-matching may involve sub-block interleaving, bit collection, and/or pruning. The scheduling entity can inform the UE about the rate-matching rules using RRC messages or DCI.

Figure 13:
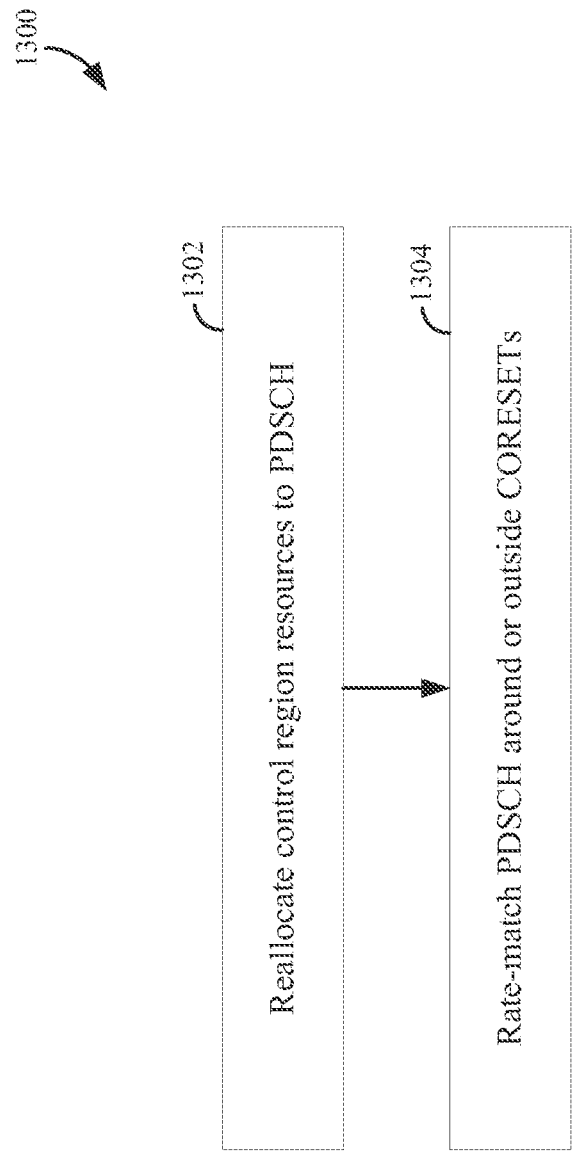
FIG. 13 is a diagram illustrating a method of rate-matching downlink (DL) user data outside of CORESETs according to some aspects of the disclosure.

FIG. 13 is a diagram illustrating a method of rate-matching DL data according to some aspects of the disclosure. At block 1302, the scheduling entity may reuse or reallocate some control region resources to the physical downlink shared channel (PDSCH). In this example, the scheduling entity does not configure or reallocate resource elements (REs) or RBs that overlap with the CORESET(s) of other UEs. At block 1304, the scheduling entity can rate-match the PDSCH outside the CORESETs. Rate matching involves interleaving bitstreams from an encoder (e.g., turbo encoder) followed by bit collection, selection and pruning to create an output bitstream with a desired code rate. In some examples, the scheduling entity rate-matches the PDSCH around or outside the C-CORESET and U-CORESET(s), and inform the UE about the rate-matching. In some examples, the scheduling entity can inform a UE, semi-statically or dynamically, about the U-CORESETs of other UEs, and rate-match the PDSCH around or outside all the informed CORESETs. In a dynamic example, a CORESET map of the carriers may be configured by higher layer signaling (e.g., RRC signaling), and a bitmap for the active CORESET(s) may be provided dynamically in the DCI of each slot. In case that wideband (WB) reference signal (RS) is used for the C-CORESET, the scheduling entity may rate-match around all the WB RS in the C-CORESET.

Figure 14:
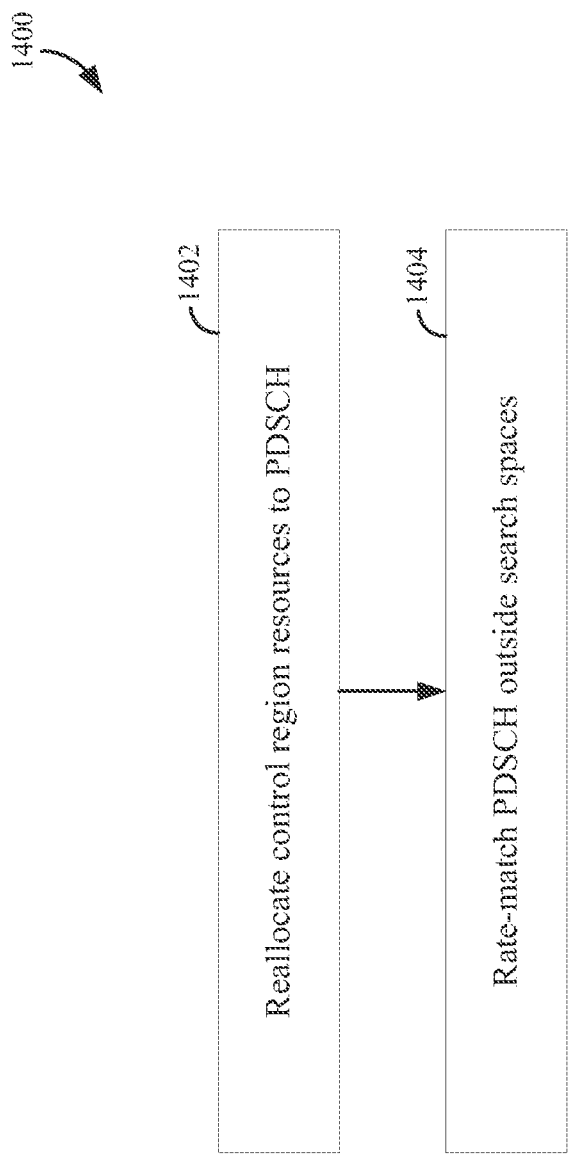
FIG. 14 a diagram illustrating a method of rate-matching DL user data outside of search spaces according to some aspects of the disclosure.

FIG. 14 is a diagram illustrating another method of rate-matching DL data according to some aspects of the disclosure. At block 1402, the scheduling entity may reuse or reallocate some control region resources to a PDSCH of a certain UE. In this example, the scheduling entity does not configure or reallocate REs or RBs that overlap with the search space(s) of other UEs. At block 1404, the scheduling entity can rate-match a PDSCH for a certain UE outside the configured search space(s) of other UEs. In some examples, the scheduling entity does not configure or reallocate resource elements that overlap with the USS of other UEs, then rate-match the PDSCH of a subject UE around or outside the CSS and USS. In another example, the scheduling entity may inform the UE, semi-statically or dynamically (per slot), about the USS of other UEs, then rate-match around or outside all the informed search spaces. In a dynamic example, an SS map of the carriers may be configured by higher layer signaling (e.g., RRC signaling), and a bitmap for the active SS may be provided dynamically in the DCI of each slot.

Figure 15:
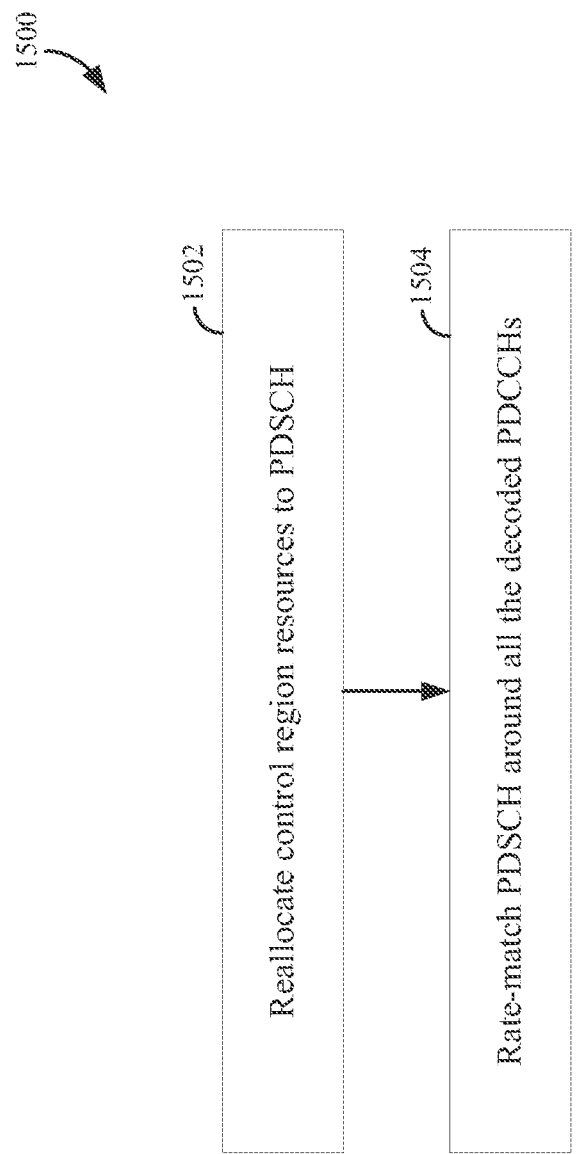
FIG. 15 a diagram illustrating a method of rate-matching DL user data outside of physical downlink control channels according to some aspects of the disclosure.

FIG. 15 is a diagram illustrating another method of rate-matching DL data according to some aspects of the disclosure. At block 1502, the scheduling entity may reuse or reallocate some control region resources to a PDSCH of a certain UE. At block 1504, the scheduling entity can rate-match the PDSCH around all the PDCCHs. In some examples, the scheduling entity does not reconfigure resource elements that overlap with PDCCHs. In another aspect of the disclosure, the scheduling entity can rate-match the PDSCH around all the PDCCHs but within the configured CORESETs. In one example, the scheduling entity ensures not to configure resource elements that overlap with PDCCHs within the configured CORESETs. In case WB RS is used for the C-CORESET, the scheduling entity can rate-match around all the WB RS in the C-CORESET.

In another aspect of the disclosure, the scheduling entity can rate match a certain UE's PDSCH around all the transmitted PDCCHs but within the configured SSs. In one example, the scheduling entity ensures not to configure resource elements that overlap with PDCCHs within the configured SSs for a subject UE. In case WB RS is used for the C-CORESET, the scheduling entity can rate-match around all the WB RS in C-CORESET.

In some aspects of the disclosure, the scheduling entity may transmit an indicator to inform a UE how the reallocated control resources are to be used in the DL data portion or PDSCH. For example, the scheduling entity may transmit an indicator that indicates a predetermined or selected rule, in the DCI or via RRC or semi-static signaling. For example, this rule informs the UE how to rate-match the PDSCH to utilize the reallocated (reused) control resources. The indicator may indicate a predetermined or selected resource reuse type. The resource reuse type may be the same as the time-domain only expansion with respect to the data region, or time and frequency domain expansion independent of the data region, as described above.

Figure 16:
FIG. 16 is a diagram illustrating a method of reusing control resources for DL user data in multiple slots according to some aspects of the disclosure.

FIG. 16 is a diagram illustrating a method of reusing control region resources for a data region in multiple slots according to some aspects of the disclosure. A scheduling entity may determine to configure control resource reuse using multi-slots. At block 1602, the scheduling entity may determine to reallocate some control region resources to a DL data region (e.g., PDSCH) in N slots (N is an integer greater than 1). At block 1604, the scheduling entity may reallocate unused control resources to a PDSCH in a first slot according to a first rule that may be any of the rate-matching rules described above. At block 1606, the scheduling entity may reallocate unused control resources to the PDSCH in a second slot according to a second rule that may be any of the rate-matching rules described above. Subsequently, at block 1608, the scheduling entity may reallocate unused control resources to the PDSCH in an N-th slot according to an N-th rule that may be any of the rate-matching rules described above.

In various examples, resource reuse rules for subsequent slots can be the same as a current slot, different per slot as specified in DCI or RRC signaling. The scheduling entity may rate-match the PDSCH for subsequent slots based on different rules. For example, rate-matching for the subsequent slots may use the same rule as the current slot, different rules per slot as specified in DCI or RRC signaling, and/or always applying conservative rules as described above to rate-match outside the CORESETs and/or SSs.

Figure 17:
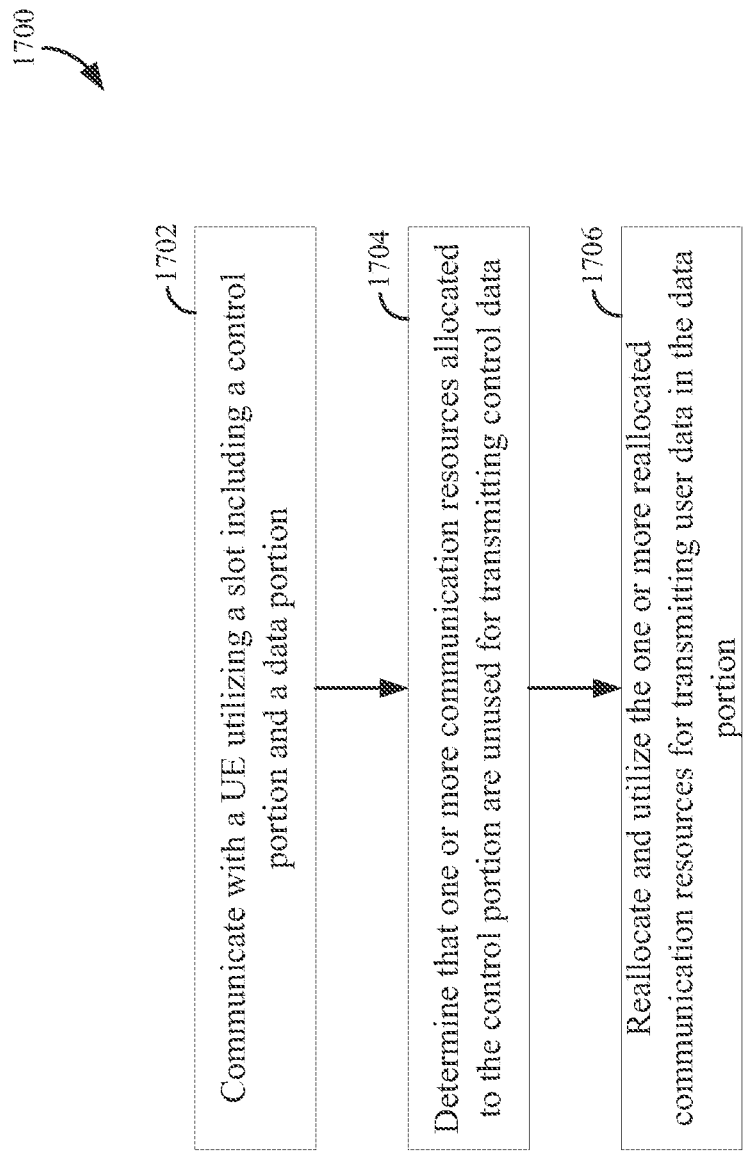
FIG. 17 is a flow chart illustrating an exemplary process at a scheduling entity for reusing control resources in a data portion of a slot according to some aspects of the present disclosure.

FIG. 17 is a flow chart illustrating an exemplary process 1700 for reusing control resources in a data portion of a slot according to some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 300 illustrated in FIG. 3. In some examples, the process 1700 may be carried out by any suitable apparatus or means for carrying out the functions or algorithm described below.

At block 1702, a scheduling entity (e.g., base station, eNB, gNB) may communicate with a UE utilizing a slot including a control portion and a data portion. For example, the scheduling entity may utilize a communication circuit 332 (see FIG. 3) to communicate with one or more UEs via a transceiver 310. Communication may include encoding, transmitting, receiving, and/or decoding of data to and/or from the one or more UEs. In one example, the slot may be a DL slot similar to the slot 500 illustrated in FIG. 5.

At block 1704, the scheduling entity may determine that one or more communication resources allocated to the control portion are unused for transmitting control data. For example, the scheduling entity may utilize a resource determination circuit 334 to determine that one or more resource elements (REs) or time-frequency resources originally allocated to the control portion are not used or needed for transmitting control data.

At block 1706, the scheduling entity may reallocate the one or more communication resources for transmitting user data in the data portion. For example, the scheduling entity may utilize a resource allocation circuit 336 to reallocate the communication resources of the control portion for transmitting payload or user data in the data portion in the same slot. The scheduling entity may indicate to the UE semi-statically or dynamically to utilize the one or more communication resources for the data portion. For example, the scheduling may use RRC signaling and/or DCI to indicate the reallocation of control resources to the data portion.

In some aspects of the disclosure, the scheduling entity may expand the data portion in the time domain to include the reallocated control resources by indicating a starting symbol position of the expanded data portion including the reused communication resources. In some aspects of the disclosure, the scheduling entity may indicate the symbol position and frequency of the reused or reallocated control resources. In some aspects of the disclosure, the scheduling entity may rate-match a physical downlink shared channel (PDSCH) utilizing the reused control resources, outside CORESETs, search spaces, and/or PDCCHs as described above.

Figure 18:
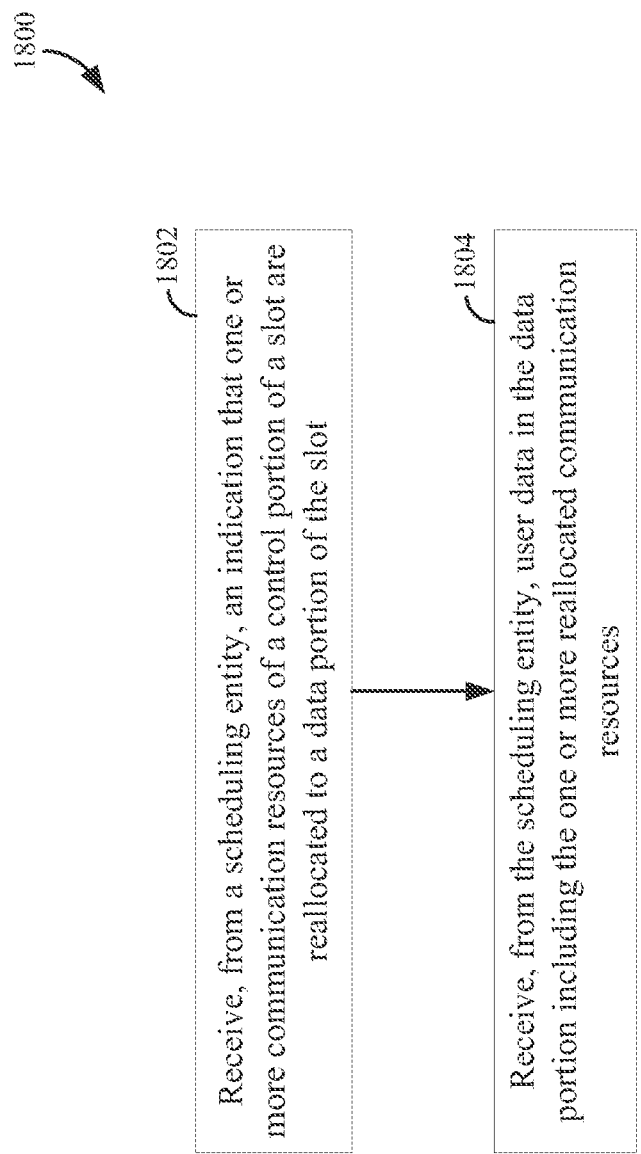
FIG. 18 is a flow chart illustrating an exemplary process at a scheduled entity for reusing control resources in a data portion of a slot according to some aspects of the present disclosure.

FIG. 18 is a flow chart illustrating an exemplary process 1800 for reusing control resources in a data portion of a slot according to some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity 400 illustrated in FIG. 4. In some examples, the process 1800 may be carried out by any suitable apparatus or means for carrying out the functions or algorithm described below.

At block 1802, a scheduled entity (e.g., UE) may receive, from a scheduling entity (e.g., gNB), an indication that one or more communication resources of a control portion of a slot (e.g., slot 500 of FIG. 5) are reallocated to a data portion of the slot. For example, the scheduling entity may utilize a communication circuit 432 to receive the indication semi-statically or dynamically in each slot. The indication may be semi-statically received in an RRC message or dynamically received in the downlink control information (DCI) of the slot.

At block 1804, the scheduled entity may receive, from the scheduling entity, user data in the data portion expanded to include the one or more communication resources. For example, the scheduled entity may utilize a resource allocation circuit 434 to determine the expanded data portion and the communication circuit 432 to receive the expanded data portion. In some examples, the data portion is expanded only in the time domain. In that case, the indication may indicate a starting symbol position of the data portion expanded to include the one or more communication resources. In some examples, the reused control resources may be identified independent of the data portion. In that case, the indication indicates the symbol position and frequency of the one or more communication resources that can be used for carrying user data of the data portion.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   communicating with a user equipment (UE) utilizing a slot comprising a control portion and a data portion;
   determining that one or more communication resources allocated to the control portion are unused for transmitting control data;
   reallocating and utilizing the one or more communication resources for transmitting user data in a physical downlink shared channel (PDSCH) in the data portion;
   indicating to the UE symbol position and frequency of the one or more communication resources reallocated in the data portion; and
   rate-matching the PDSCH outside at least one of a control resource set, a search space, or a physical downlink control channel (PDCCH) of another user equipment.

2. The method of claim 1, wherein the indicating comprises:
   indicating, in each slot, to the UE to utilize the one or more communication resources in the data portion.

3. The method of claim 1, further comprising:
   configuring the UE to utilize the one or more communication resources in the data portion of a first slot based on a first rate-matching rule; and
   configuring the UE to utilize the one or more communication resources in the data portion of a second slot based on a second rate-matching rule that is different from the first rate-matching rule.

4. An apparatus comprising:
   a communication interface configured to communicate with a user equipment (UE);
   a memory; and
   a processor operatively coupled with the communication interface and memory,
   wherein the processor and memory are configured to:
   communicate with the UE utilizing a slot comprising a control portion and a data portion;
   determine that one or more communication resources allocated to the control portion are unused for transmitting control data;
   reallocate and utilize the one or more communication resources for transmitting user data in a physical downlink shared channel (PDSCH) in the data portion;
   indicate to the UE symbol position and frequency of the one or more communication resources reallocated in the data portion; and
   rate-match the PDSCH outside at least one of a control resource set, a search space, or a physical downlink control channel (PDCCH) of another user equipment.

5. The apparatus of claim 4, wherein the processor and memory are further configured to:
   indicate, in each slot, to the UE to utilize the one or more communication resources in the data portion.

6. The apparatus of claim 4, wherein the processor and memory are further configured to:
   configure the UE to utilize the one or more communication resources in the data portion of a first slot based on a first rate-matching rule; and
   configure the UE to utilize the one or more communication resources in the data portion of a second slot based on a second rate-matching rule that is different from the first rate-matching rule.

7. A method of wireless communication at a user equipment (UE), comprising:
   receiving, from a scheduling entity, an indication that one or more communication resources of a control portion of a slot are reallocated to a data portion of the slot, wherein the indication indicates symbol position and frequency of the one or more communication resources reallocated in the data portion; and
   receiving, from the scheduling entity, user data in the data portion including the one or more reallocated communication resources in a physical downlink shared channel (PDSCH), based on a predetermined rate-matching rule of the PDSCH to exclude communication resources in at least one of a control resource set (CORESET), a search space, or a physical downlink control channel (PDCCH) of another user equipment.

8. The method of claim 7, wherein the receiving the indication comprises:
   receiving, in each slot, the indication to utilize the one or more communication resources in the data portion.

9. The method of claim 7, further comprising:
   utilizing the one or more communication resources in the data portion of a first slot based on a first rate-matching rule; and utilizing the one or more communication resources in the data portion of a second slot based on a second rate-matching rule that is different from the first rate-matching rule.

10. An apparatus comprising:
a communication interface configured to communicate with a scheduling entity;
a memory; and
a processor operatively coupled with the communication interface and memory,
wherein the processor and memory are configured to:
receive, from the scheduling entity, an indication that one or more communication resources of a control portion of a slot are reallocated to a data portion of the slot, wherein the indication indicates symbol position and frequency of the one or more communication resources reallocated in the data portion; and
receive, from the scheduling entity, user data in the data portion including the one or more reallocated communication resources in a physical downlink shared channel (PDSCH), based on a predetermined rate-matching rule of the PDSCH to exclude communication resources in at least one of a control resource set (CORESET), a search space, or a physical downlink control channel (PDCCH) of another user equipment.

11. The apparatus of claim 10, wherein the processor and memory are further configured to:
receive, in each slot, the indication to utilize the one or more communication resources in the data portion.

12. The apparatus of claim 10, wherein the processor and memory are further configured to:
utilize the one or more communication resources in the data portion of a first slot based on a first rate-matching rule; and
utilize the one or more communication resources in the data portion of a second slot based on a second rate-matching rule that is different from the first rate-matching rule.

* * * * *